(12) United States Patent
Kumar et al.

(10) Patent No.: US 6,677,787 B1
(45) Date of Patent: Jan. 13, 2004

(54) POWER INDICATION CIRCUIT FOR A PROCESSOR

(75) Inventors: Anil V. Kumar, Hillsboro, OR (US); Jonathan P. Douglas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/194,101

(22) Filed: Jul. 12, 2002

(51) Int. Cl.[7] .................................................. H03L 7/00
(52) U.S. Cl. ...................................................... 327/143
(58) Field of Search ................................. 327/142, 143, 327/198

(56) References Cited

U.S. PATENT DOCUMENTS

| | | | | |
|---|---|---|---|---|
| 4,309,627 A | * | 1/1982 | Tabata | 327/81 |
| 4,970,408 A | * | 11/1990 | Hanke et al. | 327/143 |
| 5,617,048 A | * | 4/1997 | Ward et al. | 327/143 |
| 6,515,524 B1 | * | 2/2003 | Sterrantino et al. | 327/143 |

* cited by examiner

*Primary Examiner*—Jeffrey Zweizig
(74) *Attorney, Agent, or Firm*—Buckley, Maschoff, Talwalkar & Allison LL

(57) ABSTRACT

According to some embodiments, a reference voltage signal initially increases with increases in a processor voltage signal and then decreases with a further increase in the processor voltage signal. Moreover, according to some embodiments a comparator circuit generates a power indication signal when a substantially scaled processor voltage signal exceeds a reference voltage signal.

27 Claims, 9 Drawing Sheets

US 6,677,787 B1

POWER INDICATION CIRCUIT FOR A PROCESSOR

BACKGROUND

A circuit may be used to determine when a voltage signal transitions across a threshold level. For example, a microprocessor or a Very Large-Scale Integration (VLSI) circuit may need to determine when a processor voltage signal reaches an acceptable voltage level.

Traditionally, such a determination is made by a circuit that uses a stable voltage reference signal. FIG. 1 illustrates traditional relationships 100 between a processor voltage signal, a reference voltage signal, a slightly scaled processor voltage signal, and a power indication signal at different temperatures.

Consider first a reference voltage signal 110 generated at 100° Centigrade (C). Note that the reference voltage signal 110 initially increases along with the processor voltage signal (Vcc) That is, the reference voltage signal 100 is about 400 millivolts (mV) when Vcc is 400 mV. Above that Vcc, the reference voltage signal 110 begins to stabilize. That is, the rate of increase of the reference voltage signal 110 begins to decrease (as compared to Vcc) when Vcc reaches approximately 600 millivolts (mV). Traditionally, only a limited number of stable reference voltage values can be produced by such a circuit (e.g., based on diode thresholds, silicon band gap voltages, and/or transistor thresholds associated with the circuit). In order to generate other reference voltage values, scaling circuits may be used.

A slightly scaled processor voltage signal 120 at 100° C. is generated by scaling down Vcc (e.g., with resistors). As a result, the slightly scaled processor voltage signal 120 rises at a slightly slower rate as compared to Vcc. For example, the slightly scaled processor voltage signal 120 illustrated in FIG. 1 reaches approximately 1.0 Volt (V) when Vcc is 1.2 V.

A power indication signal 130 is then generated when the slightly scaled processor voltage signal 120 transitions past the reference voltage signal 110. The power indication signal 130 may indicate, for example, that Vcc has now reached an acceptable voltage level for a processor. The point (e.g., the Vcc) at which the power indication signal 130 is generated is determined by the transfer curve of the circuit. This point may be modified to a desired level by, for example, adjusting the resistance used to scale down the processor voltage.

There are several disadvantages, however, with the traditional methods of generating a power indication for a processor. For example, consider a reference voltage signal 112 that is generated when the temperature of the circuit is 0° C. Note that this reference voltage signal 112 levels off at a higher value as compared to the reference voltage signal 110 at 100° C. Also note that the slightly scaled processor voltage signal 122 at 0° C. does not significantly change as compared to the signal 120 at 100° C. As a result, the power indication signal 132 is not generated until a higher Vcc is reached (e.g., the power indication signal 132 at 0° C. occurs approximately 200 mV after the power indication signal 130 at 100° C.). This temperature sensitivity is undesirable because the predetermined acceptable voltage level for the processor has not actually changed.

Moreover, because the difference between the reference voltage signal and the slightly scaled processor voltage signal is small, the circuit will be sensitive to voltage noise. For example, FIG. 2 illustrates traditional relationships 200 between Vcc, a reference voltage signal 210, a slightly scaled processor voltage signal 220, and a power indication signal 230 when 200 mV of Alternating Current (AC) noise is introduced to a traditional power indication circuit. Note that the power indication signal 230 is generated multiple times because the slightly scaled processor voltage signal 220 crosses the reference voltage signal 210 many times. This result is also undesirable because no clear indication of an acceptable voltage level is provided.

DETAILED DESCRIPTION

Some embodiments are associated with circuits that generate a power indication that reflects when a processor voltage exceeds a "threshold" value. As used herein, a threshold value may be associated with, for example, an acceptable voltage level for a processor (e.g., an INTEL® PENTIUM® processor).

Curve Shaping and Power Indication Circuits

Figure 3:
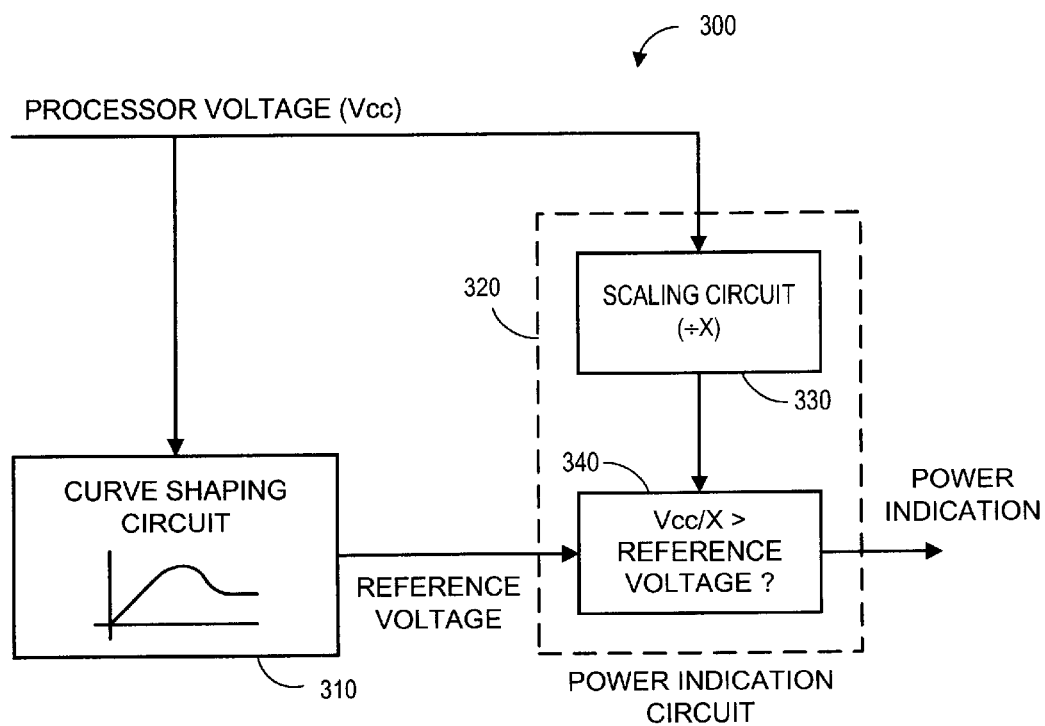
FIG. 3 is a block diagram of a circuit according to some embodiments.

FIG. 3 is a block diagram of a circuit 300 according to some embodiments. The circuit 300 includes a curve shaping circuit 310 that receives a processor voltage signal (i.e., Vcc) and provides a reference voltage signal that may be used to determine when the processor voltage signal exceeds a threshold value.

The curve shaping circuit 310 generates the reference voltage signal such that the reference voltage signal initially increases with increases in the processor voltage signal and then decreases with further increases in the processor voltage signal.

Figure 4:
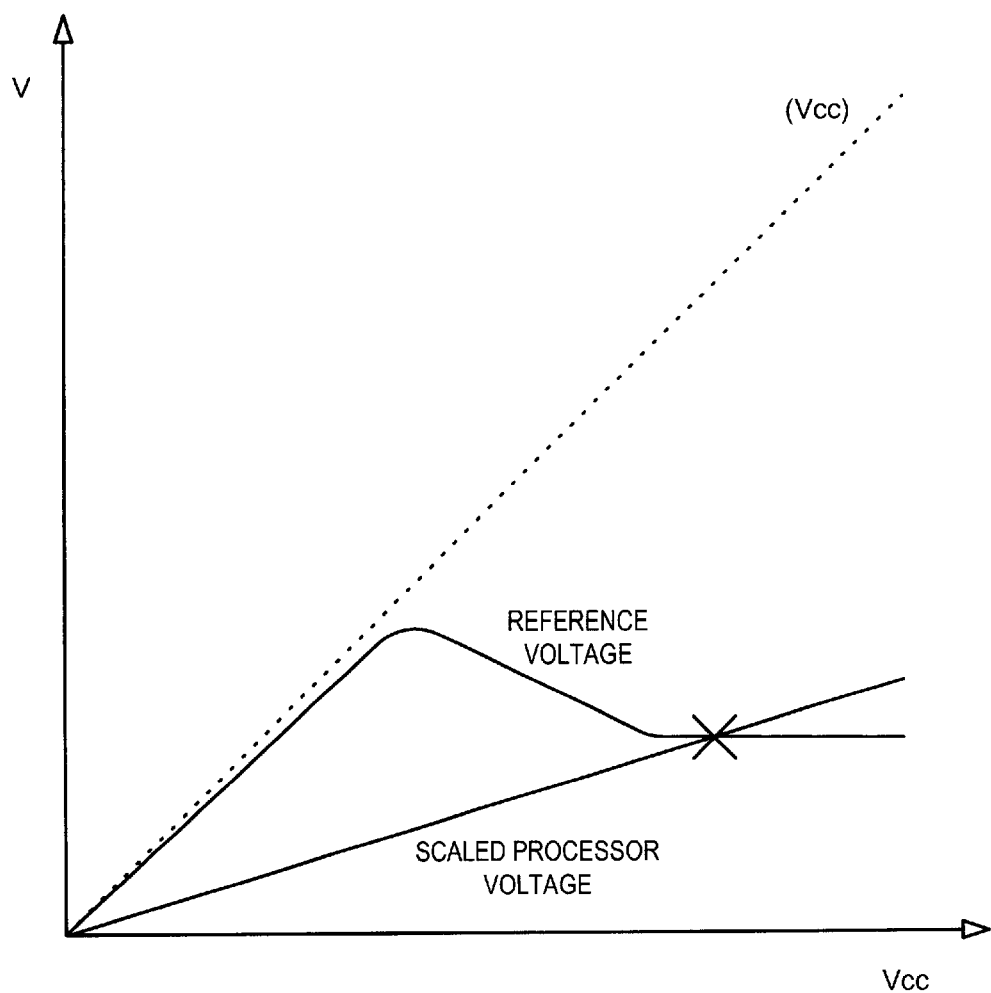
FIG. 4 illustrates relationships between a processor voltage signal, a reference voltage signal, a scaled processor voltage signal, and a power indication signal according to some embodiments.

Consider FIG. 4 which illustrates relationships 400 between a processor voltage signal (Vcc) and a reference voltage signal according to some embodiments. As can be seen, the reference voltage signal initially increases along with the processor voltage signal. The period of this increase may be associated with, for example, a voltage threshold of a transistor in the curve shaping circuit 310.

The reference voltage signal then decreases with a further increase in the processor voltage signal. Note that the reference voltage signal may decrease substantially with a further increase in the processor voltage signal. For example, the reference voltage signal may rise to 500 mV before stabilizing at 350 mV. This may be achieved, for example, by clamping the reference voltage signal to a voltage threshold of a diode in the curve shaping circuit 310.

According to some embodiments, the curve shaping circuit 310 generates the reference voltage signal such that the reference voltage signal will exceed a scaled threshold value before stabilizing at the scaled threshold value. Note that the scaled threshold value does not need to equal an acceptable voltage level for the processor (e.g., if the acceptable voltage level for a processor is 1 V the scaled threshold value might be 350 mV).

Referring again to FIG. 3, the circuit 300 also includes a power indication circuit 320 that receives: (i) the processor voltage signal, and (ii) the reference voltage signal generated by the curve shaping circuit 310. In particular, the power indication circuit 320 includes a scaling circuit 330 that generates a scaled processor voltage signal based on the processor voltage signal. The scaling circuit 330 may comprise, for example, a variable resistance divider to substantially scale down the processor voltage signal (e.g., by generating Vcc/x). As used herein, a "substantially" scaled down processor voltage signal may comprise a signal that has been reduced by at least fifty percent.

The power indication circuit 320 further includes a comparator circuit 340 that generates a power indication signal when the output of the scaling circuit 340 (e.g., Vcc/x) exceeds the reference voltage received from the curve shaping circuit 310.

Referring again to FIG. 4, which further illustrates relationships between the processor voltage signal, the reference voltage signal, and a scaled processor voltage signal according to some embodiments. As can be seen, the scaled processor voltage signal rises along with the processor voltage signal—although at a slower rate (e.g., the scaled processor voltage signal might represent Vcc/3). Moreover, the comparator circuit 340 generates a power indication signal when the scaled processor voltage signal exceeds the reference voltage signal (e.g., as represented by an "X" in FIG. 4).

Note that the reference voltage signal and the scaled processor voltage signal may reduce a temperature sensitivity of the power indication signal. Consider, for example, the case wherein the scaling circuit 320 reduces the processor voltage by fifty percent in order to generate the scaled processor voltage. In this case, the reference voltage signal provided by the curve shaping circuit 310 may stabilize at a value equal to half of an acceptable processor voltage level. As a result, the comparator circuit 340 generates the power indication signal when the scaled processor voltage signal exceeds the stabilized reference voltage signal (i.e., Vcc/2 will exceed half of the acceptable processor voltage value—and thus Vcc will exceed the acceptable processor voltage value). Because the reference voltage signal and the processor voltage signal have been substantially scaled down, the temperature sensitivity of the circuit 300 may be correspondingly reduced e.g., by fifty percent) as compared to a traditional circuit. An example of reduced temperature sensitivity is described with respect to FIG. 8.

Moreover, the reference voltage signal and the scaled processor voltage signal may reduce a noise sensitivity of the power indication signal. Note that the scaled processor voltage signal increases at a slower rate as compared to Vcc. The reference voltage signal, on the other hand, initially increases directly with Vcc and then decreases and stabilizes at a scaled threshold value. As a result, the reference voltage signal may generally differ from the scaled processor voltage signal by an amount greater than that associated with a traditional circuit. Thus, the effect of noise (e.g., the likelihood that the scaled processor voltage signal will transition across the reference voltage signal multiple times) may be reduced. An example of reduced noise sensitivity is described with respect to FIG. 9.

Power Indication Method

Figure 5:
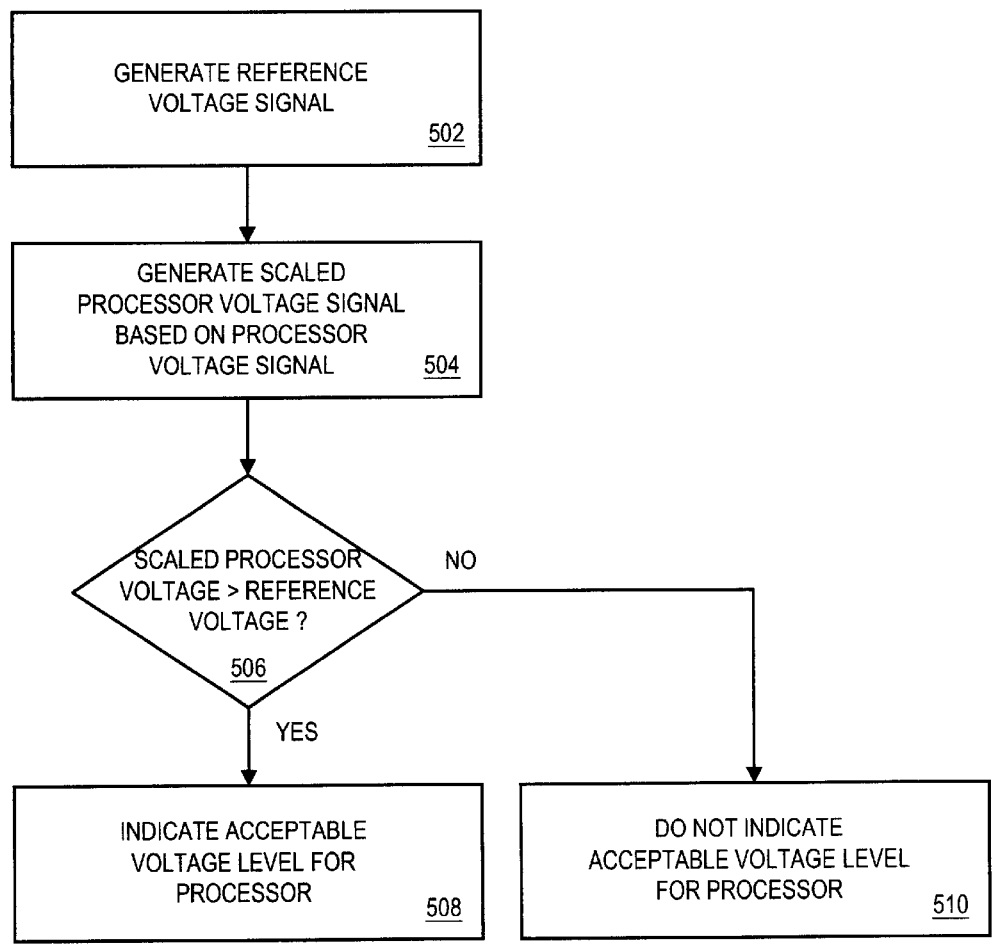
FIG. 5 is a flow chart of a method of generating a power indication signal according to some embodiments.

FIG. 5 is a flow chart of a method of generating a power indication according to some embodiments. The flow chart does not imply a fixed order to the actions, and embodiments of the present invention may be practiced in any order that is practicable. The method may be associated with, for example, the circuit 300 illustrated in FIG. 3.

At 502, a reference voltage signal is generated. For example, the curve shaping circuit 310 may generate the reference voltage signal such that the reference voltage signal initially increases with increases in a processor voltage signal and then decreases with a further increase in the processor voltage signal.

At 504, a scaled processor voltage signal is generated based on the processor voltage signal. For example, the scaling circuit 320 may reduce the processor voltage signal by fifty percent.

If the scaled processor voltage signal exceeds the reference voltage signal at 506, a power indication is generated at 508. The power indication may represent, for example, that an acceptable voltage level for a processor has been achieved. If the scaled processor voltage signal does not exceed the reference voltage signal at 506, no power indication is generated at 510.

EXAMPLE

Figure 6:
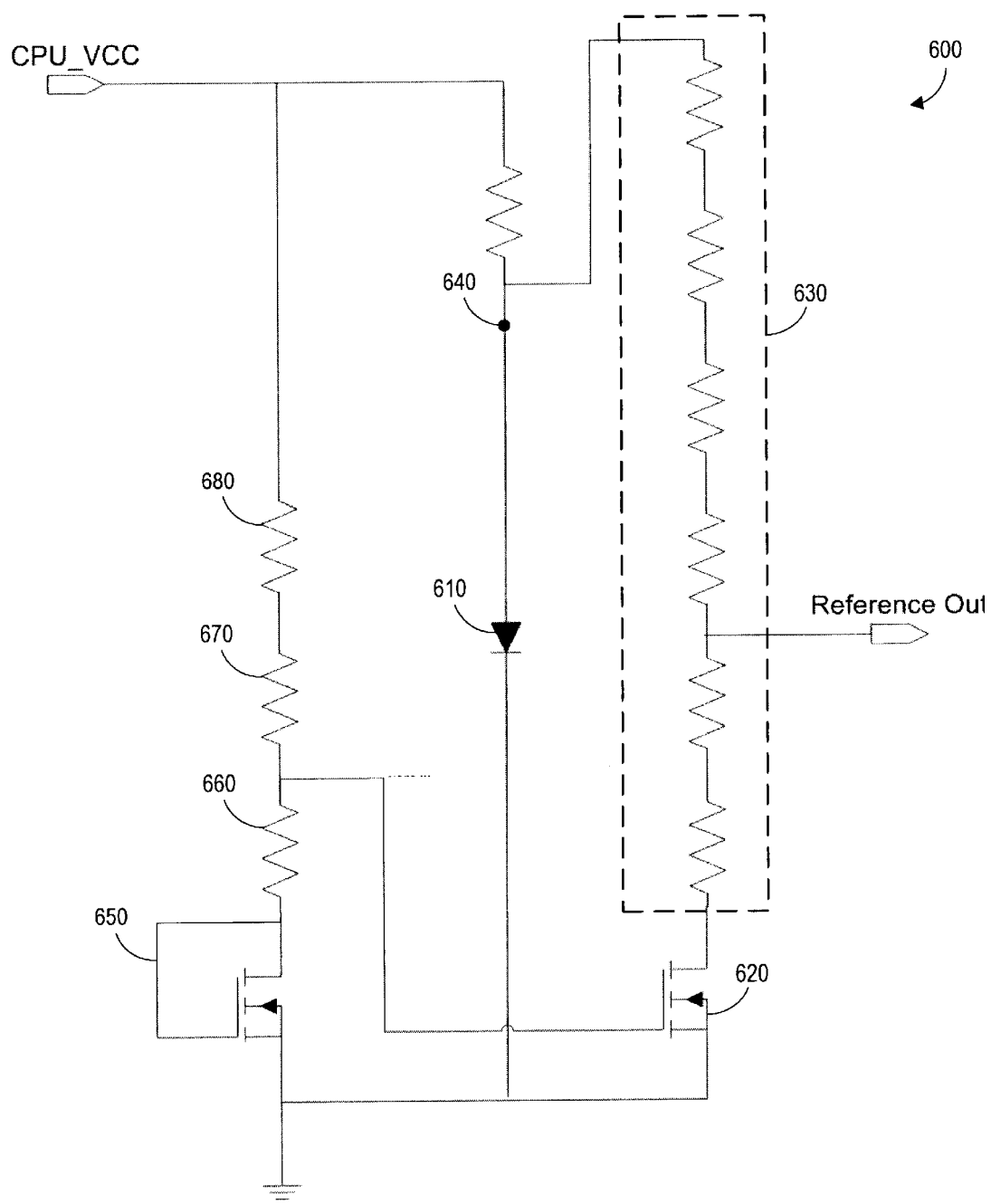
FIG. 6 is an example of a curve shaping circuit according to one embodiment.

FIG. 6 is an example of a curve shaping circuit 600 according to one embodiment. The curve shaping circuit 600 includes a processor voltage input line ("CPU_VCC") to receive a processor voltage signal and a reference voltage output line ("REFERENCE_OUT") to provide a reference voltage signal (e.g., to the power indication circuit described with respect to FIG. 7).

The curve shaping circuit 600 generates the reference voltage signal such that the reference voltage signal initially increases with increases in the processor voltage signal and then decreases (e.g., substantially decreases) and eventually stabilizes with further increases in the processor voltage signal. The period of the increase may be associated with, for example, a voltage threshold of a transistor in the curve shaping circuit 600. The decrease and stabilization of the reference voltage signal may be achieved, for example, by clamping the reference voltage signal to a voltage threshold of a diode 610 in the curve shaping circuit 600.

Figure 7:
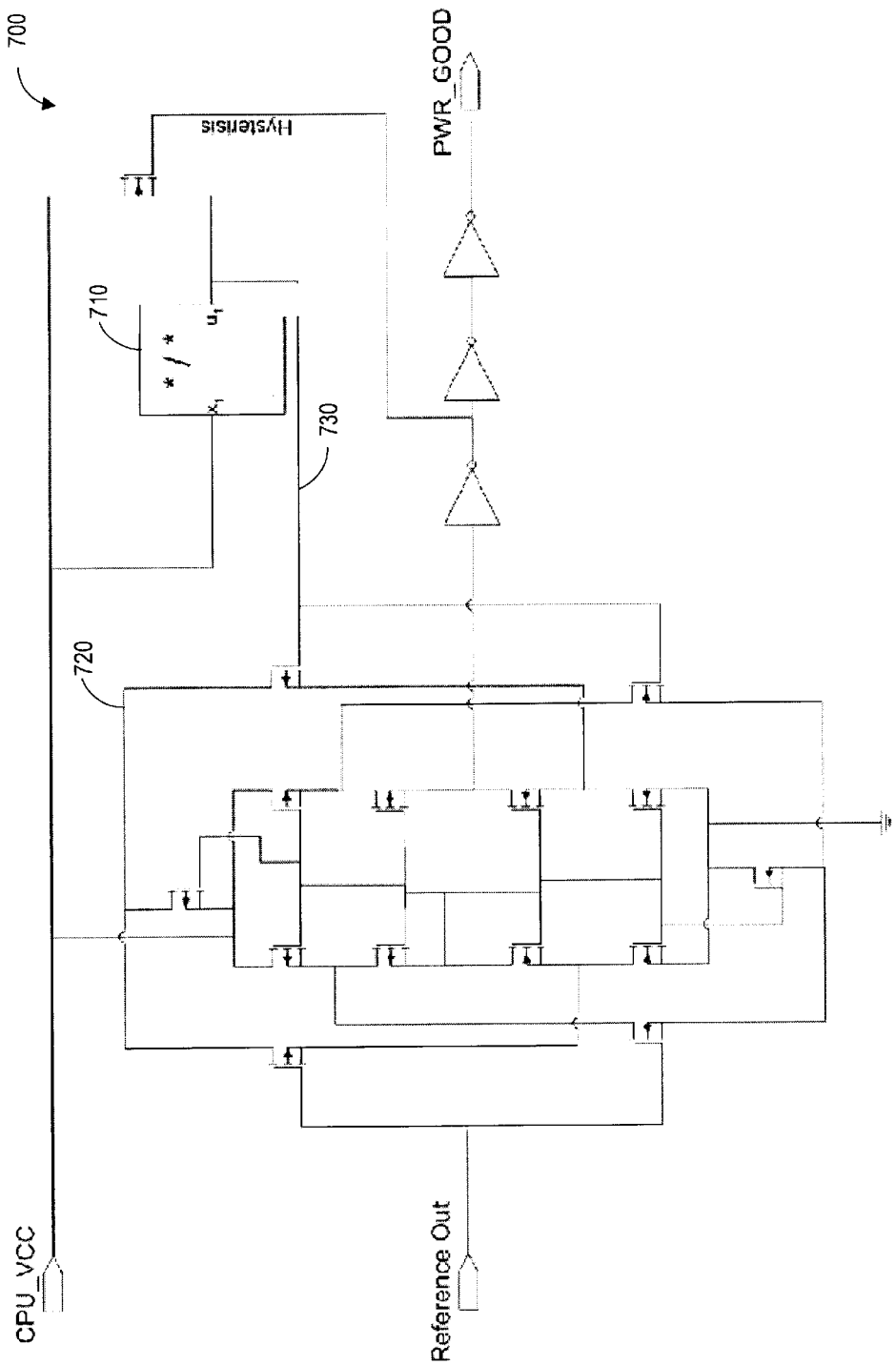
FIG. 7 is an example of a power indication circuit according to one embodiment.

FIG. 7 is an example of a power indication circuit 700 according to one embodiment. The power indication circuit 700 includes a processor voltage input line ("CPU_VCC") to receive a processor voltage signal and a reference voltage input line ("REFERENCE_OUT") to receive a reference voltage signal (e.g., from the curve shaping circuit 600 described with respect to FIG. 6). The power indication circuit 700 further includes a power indication output line to provide a power indication signal (e.g., "PWR_GOOD").

The power indication circuit 700 includes a variable resistance divider 710 to substantially scale down the processor voltage signal (e.g., to generate Vcc/x). The power indication circuit 700 further includes a comparator that generates the power indication signal when the output of the variable resistance divider 710 exceeds the reference voltage received from the curve shaping circuit 600.

Figure 8:
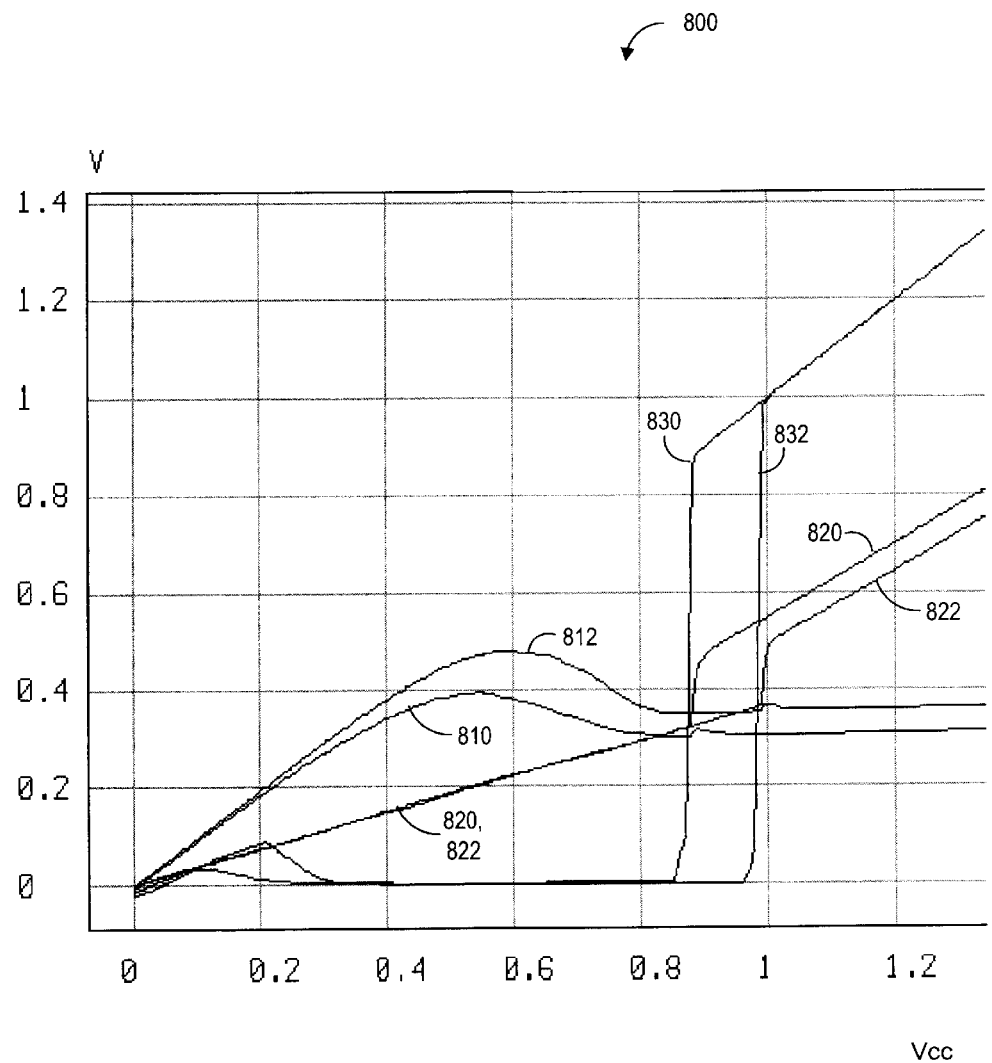
FIG. 8 illustrates relationships between a processor voltage signal, a reference voltage signal, a scaled processor voltage signal, and a power indication signal at different temperatures for the circuits of FIGS. 6 and 7.

FIG. 8 illustrates relationships 800 between a processor voltage signal (Vcc), a reference voltage signal, a scaled reference voltage signal, and a power indication signal at different temperatures for the circuits of FIGS. 6 and 7.

Consider first the reference voltage signal 810 generated by the curve shaping circuit 600 at 100° C. Note that the reference voltage signal 810 initially increases along with the processor voltage signal, then decreases, and finally stabilizes at about 300 mV after Vcc reaches about 800 mV.

A scaled processor voltage signal 820 at 100° C. is generated by substantially scaling down the processor voltage signal. As a result, the scaled processor voltage 820 rises at a substantially slower rate as compared to Vcc. For example, the scaled processor voltage signal 820 illustrated in FIG. 8 is approximately 300 mV when Vcc is 800 mV.

A power indication signal 830 is then generated when the scaled processor voltage signal 820 transitions past the reference voltage signal 810. The power indication signal 830 may indicate, for example, that Vcc has now reached an acceptable voltage level for a processor.

Figure 1:
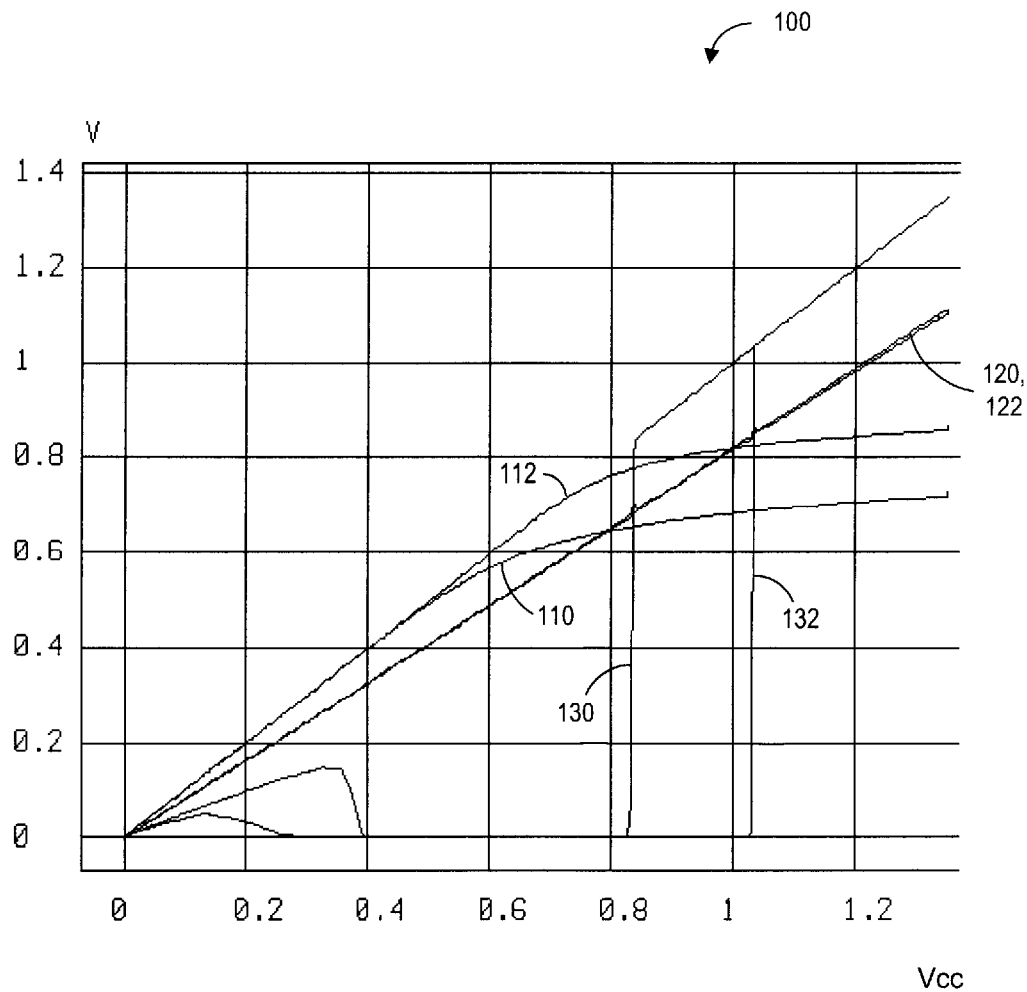
FIG. 1 illustrates traditional relationships between a processor voltage signal, a reference voltage signal, a slightly scaled processor voltage signal, and a power indication signal at different temperatures.

Note that the curve shaping circuit 600 and the power indication circuit 700 may substantially reduce temperature sensitivity as compared to traditional circuits. For example, consider a reference voltage signal 812 generated by the curve shaping circuit 600 when the temperature of the circuit is 0° C. In this case, the reference voltage signal 812 eventually stabilizes at about 350 mV (instead of 300 mV). Moreover, the power indication signal 832 at 0° C. is generated about 100 mV after the Vcc at which it would have been generated at 100° C. (as compared to the 200 mV difference associated with FIG. 1). That is, because the reference voltage signals and the processor voltage signals have been substantially scaled down, the temperature sensitivity has been correspondingly reduced.

Figure 2:
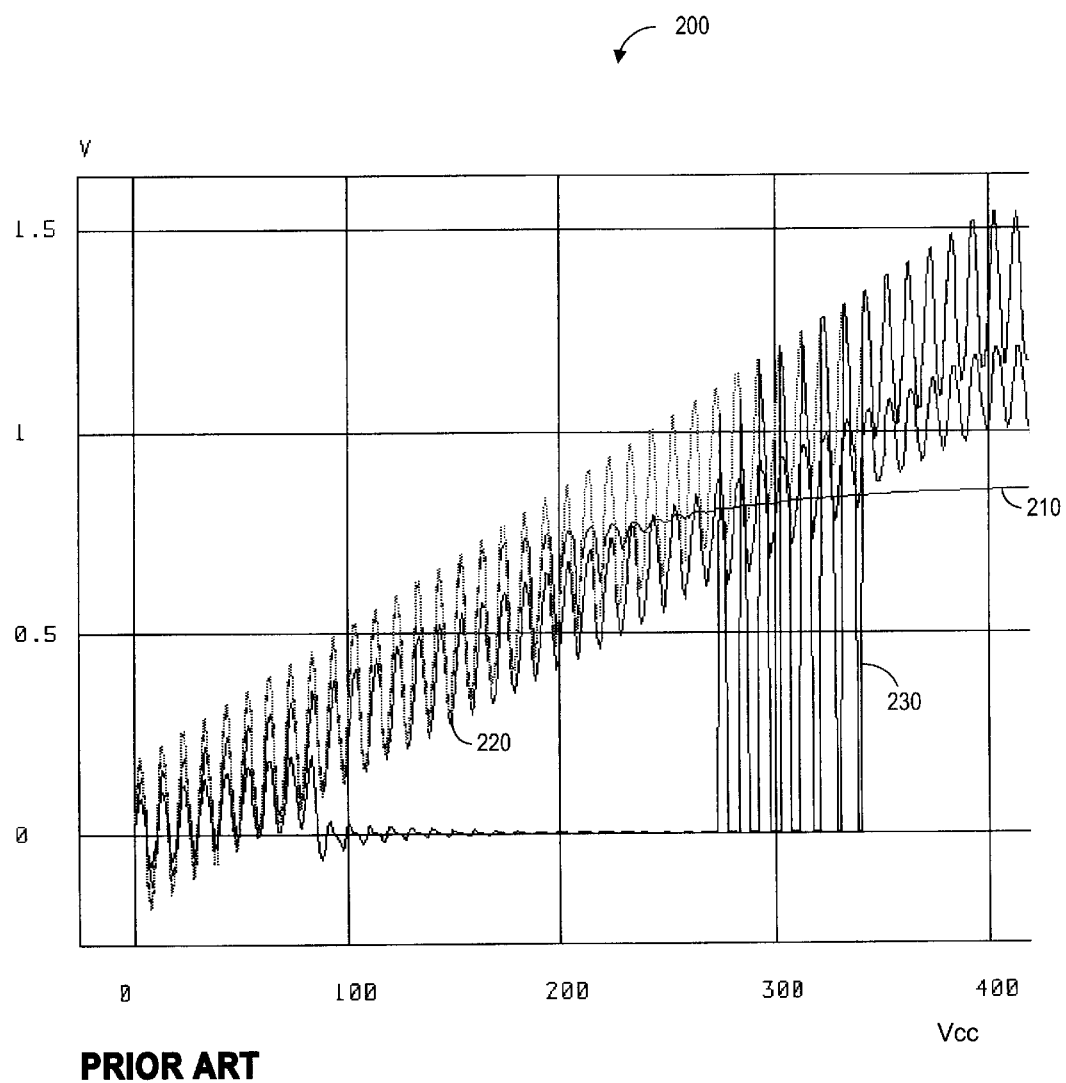
FIG. 2 illustrates traditional relationships between a processor voltage signal, a reference voltage signal, a slightly scaled processor voltage signal, and a power indication signal when voltage noise is introduced.
Figure 9:
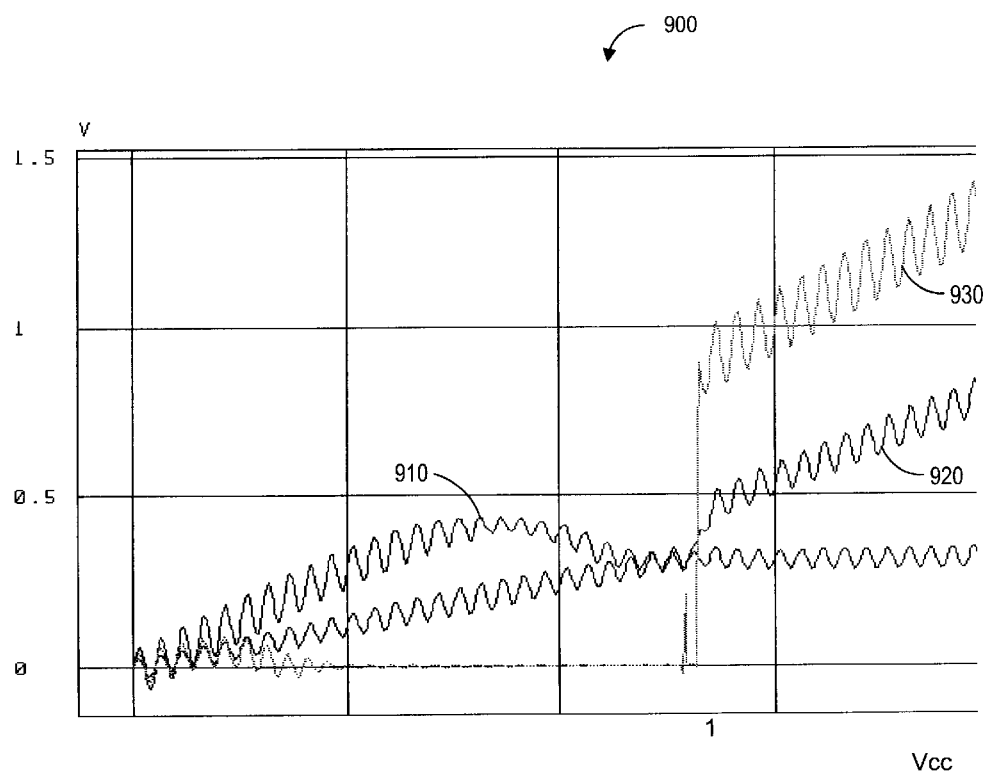
FIG. 9 illustrates relationships between a processor voltage signal, a reference voltage signal, a scaled processor voltage signal, and a power indication signal when voltage noise is introduced into the circuits of FIGS. 6 and 7.

FIG. 9 illustrates relationships 900 between a processor voltage signal (Vcc), a reference voltage signal 910, a scaled reference voltage signal 920, and a power indication signal 930 when 200 mV of AC noise is introduced into the circuits of FIGS. 6 and 7. Note that the scaled processor voltage 920 increases at a slower rate than Vcc. The reference voltage signal 910, on the other hand, initially increases directly with Vcc and then decreases and stabilizes at a scaled threshold value (e.g., around 300 mV). As a result, the reference voltage signal 910 may generally differ from the scaled processor voltage signal 920 by an amount greater than that associated with a traditional circuit. Thus, the effect of noise may be reduced and the scaled processor voltage signal 920 may transition across the reference voltage signal 910 fewer times as compared to a traditional circuit (e.g., as compared to FIG. 2).

Thus, embodiments may substantially reduce temperature and noise sensitivity for a power indication signal as compared to traditional circuits, and a more robust processor may be provided.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Note that FIGS. 6 and 7 merely illustrate examples of circuits that might be provided according to one embodiment, and that any number of other circuits could instead be used. Moreover, the power indication signal may represent a condition other than an acceptable processor voltage level (e.g., a power indication may represent that a voltage level is no longer acceptable). Similarly, although particular voltage level values are discussed herein, embodiments may be provided for any voltage level values.

The several embodiments described herein are solely for the purpose of illustration. Persons skilled in the art will recognize from this description other embodiments may be practiced with modifications and alterations limited only by the claims.

What is claimed is:

1. A circuit, comprising:
   a processor voltage input line to receive a processor voltage signal;
   a variable resistance divider to substantially scale down the processor voltage signal to generate a scaled processor voltage signal;
   a reference voltage input line to receive a reference voltage signal; and
   a comparator circuit to generate a power indication signal when the scaled processor voltage signal exceeds the reference voltage signal.

2. The circuit of claim 1, wherein the power indication signal is associated with an acceptable voltage level for a processor.

3. The circuit of claim 1, wherein the reference voltage signal initially increases with increases in the processor voltage signal and then decreases with a further increase in the processor voltage signal.

4. The circuit of claim 3, wherein the reference voltage signal decreases substantially with a further increase in the processor voltage signal.

5. The circuit of claim 3, wherein the reference voltage signal follows the processor voltage signal up to a level associated with a transistor voltage threshold.

6. The circuit of claim 3, wherein the reference voltage is clamped to a diode voltage threshold.

7. The circuit of claim 1, wherein the reference voltage signal and the scaled processor voltage signal substantially reduce a temperature sensitivity of the power indication signal.

8. The circuit of claim 1, wherein the reference voltage signal and the scaled processor voltage signal substantially reduce a noise sensitivity of the power indication signal.

9. A method, comprising:
   substantially scaling down a processor voltage signal with a variable resistance divider;
   comparing the scaled processor voltage signal to a reference voltage signal; and
   generating a power indication signal based on the comparison.

10. The method of claim 9, wherein the power indication signal is associated with an acceptable voltage level for a processor.

11. The method of claim 9, wherein the reference voltage signal initially increases with increases in the processor voltage signal and then decreases with a further increase in the processor voltage signal.

12. The method of claim 11, wherein the reference voltage signal decreases substantially with a further increase in the processor voltage signal.

13. The method of claim 11, wherein the reference voltage signal follows the processor voltage signal up to a level associated with a transistor voltage threshold.

14. The method of claim 11, wherein the reference voltage is clamped to a diode voltage threshold.

15. The method of claim 9, wherein the reference voltage signal and the scaled processor voltage signal substantially reduce a temperature sensitivity of the power indication signal.

16. The method of claim 9, wherein the reference voltage signal and the scaled processor voltage signal substantially reduce a noise sensitivity of the power indication signal.

17. A system, comprising:
   a power supply to receive alternating current power and to provide direct current power associated with a processor voltage signal; and
   a processor, including:
      a processor voltage input line to receive the processor voltage signal,
      a variable resistance divider to substantially scale down the processor voltage signal to generate a scaled processor voltage signal,
      a reference voltage input line to receive a reference voltage signal, and
      a comparator circuit to generate a power indication signal when the scaled processor voltage signal exceeds the reference voltage signal.

18. The system of claim 17, wherein the power indication signal is associated with an acceptable voltage level for the processor.

19. The system of claim 17, wherein the reference voltage signal initially increases with increases in the processor voltage signal and then decreases with a further increase in the processor voltage signal.

20. The system of claim 19, wherein the reference voltage signal decreases substantially with a further increase in the processor voltage signal.

21. The system of claim 19, wherein the reference voltage signal follows the processor voltage signal up to a level associated with a transistor voltage threshold.

22. The system of claim 19, wherein the reference voltage is clamped to a diode voltage threshold.

23. The system of claim 17, wherein the reference voltage signal and the scaled processor voltage signal substantially reduce a temperature sensitivity of the power indication signal.

24. The system of claim 17, wherein the reference voltage signal and the scaled processor voltage signal substantially reduce a noise sensitivity of the power indication signal.

25. A circuit, comprising:
   a processor voltage input line to receive a processor voltage signal;
   a reference voltage output line to provide a reference voltage signal associated with a determination of when the processor voltage signal exceeds a threshold value;
   a curve shaping circuit to generate the reference voltage signal such that the reference voltage signal initially increases with increases in the processor voltage signal and then decreases with a further increase in the processor voltage signal; and
   a power indication circuit, including:
      a processor voltage input line to receive the processor voltage signal,
      a variable resistance diver to substantially scale down the processor voltage signal,
      a reference voltage input line to receive the reference voltage signal, and
      a comparator circuit to generate a power indication signal when the scaled down processor voltage signal exceeds the reference voltage signal.

26. The circuit of claim 25, wherein the reference voltage signal and the scaled processor voltage signal substantially reduce a temperature sensitivity of the power indication signal.

27. The circuit of claim 25, wherein the reference voltage signal and the scaled processor voltage signal substantially reduce a noise sensitivity of the power indication signal.

* * * * *